United States Patent [19]

Randel

[11] Patent Number: 5,418,720
[45] Date of Patent: May 23, 1995

[54] SYMBOL WIDTH MEASUREMENT SYSTEM

[75] Inventor: Robert J. Randel, Farmington Hills, Mich.

[73] Assignee: Chrysler Corporation, Highland Park, Mich.

[21] Appl. No.: 74,087

[22] Filed: Jun. 9, 1993

[51] Int. Cl.$^6$ .............................................. G06F 13/38
[52] U.S. Cl. .............................. 364/424.03; 364/487; 364/574; 364/514 R
[58] Field of Search .................. 370/85.1; 375/10; 328/111; 378/45; 73/116, 117.2; 364/424.03, 574, 514, 487; 340/439, 534, 635, 650; 324/402

[56] References Cited

U.S. PATENT DOCUMENTS

| | | | |
|---|---|---|---|
| 4,021,667 | 5/1977 | Clausen et al. | 378/45 |
| 4,186,298 | 1/1980 | Kinbara | 377/20 |
| 4,692,710 | 8/1987 | Shvartsman | 328/111 |
| 4,694,468 | 9/1987 | Cullum | 375/10 |
| 5,274,636 | 12/1993 | Halter et al. | 370/85.1 |

Primary Examiner—Emanuel T. Voeltz
Assistant Examiner—Thomas Peeso
Attorney, Agent, or Firm—Wendell K. Fredericks

[57] ABSTRACT

A symbol width measurement system for detecting and analyzing the effects of ground offset voltages and signal noise on J1850 symbol widths appearing on a multi-node multiplexed data communications system.

6 Claims, 7 Drawing Sheets

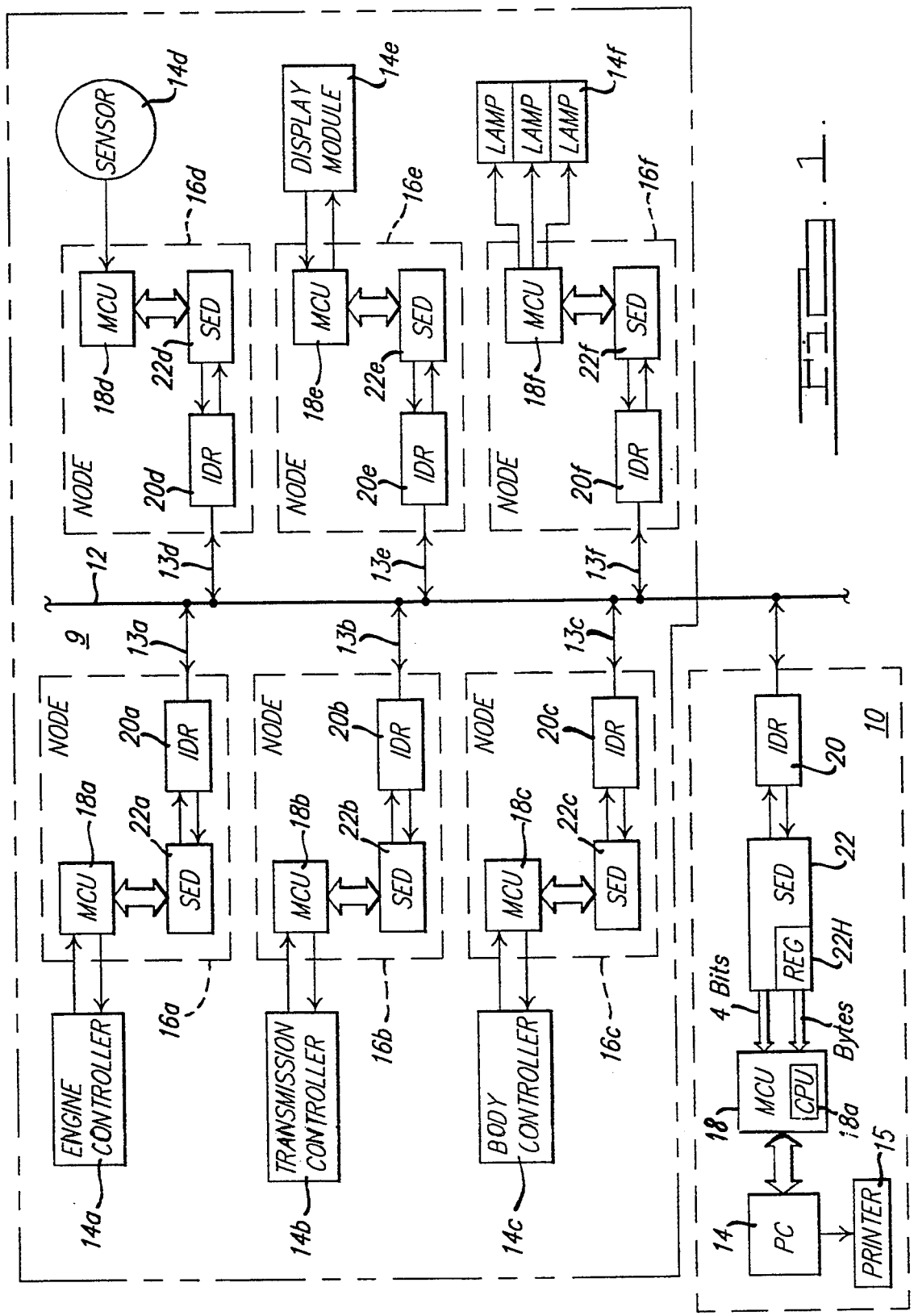

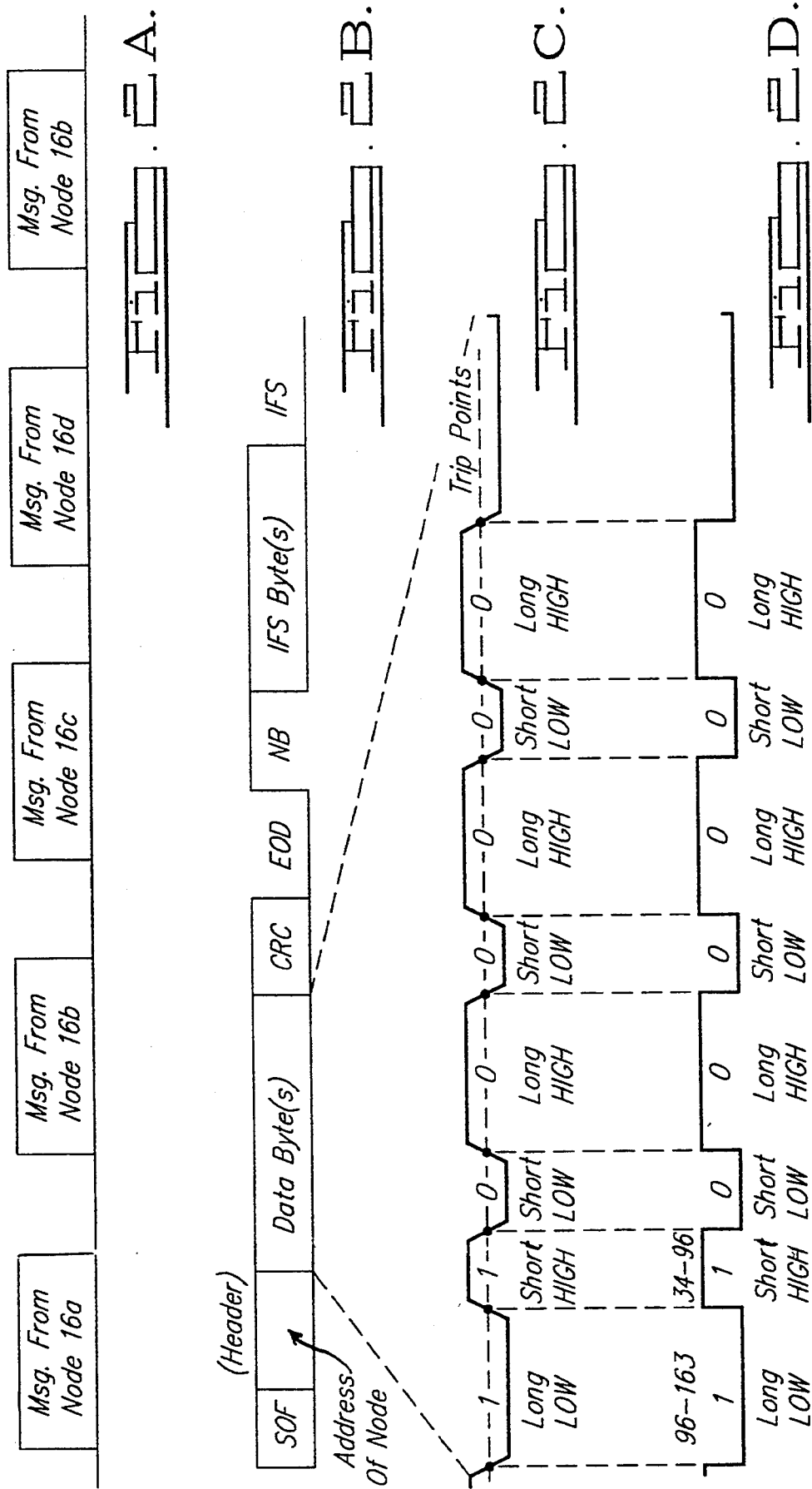

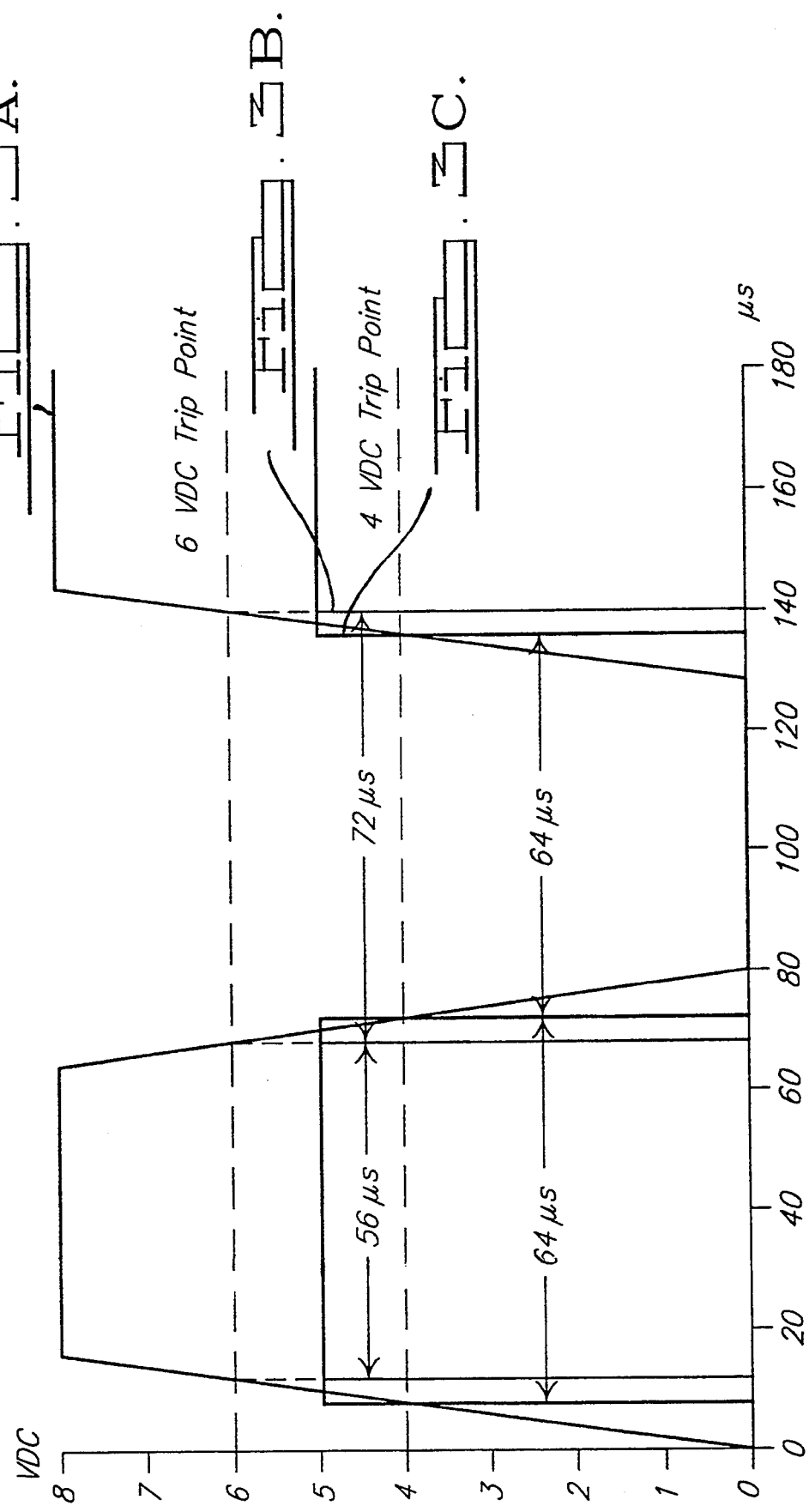

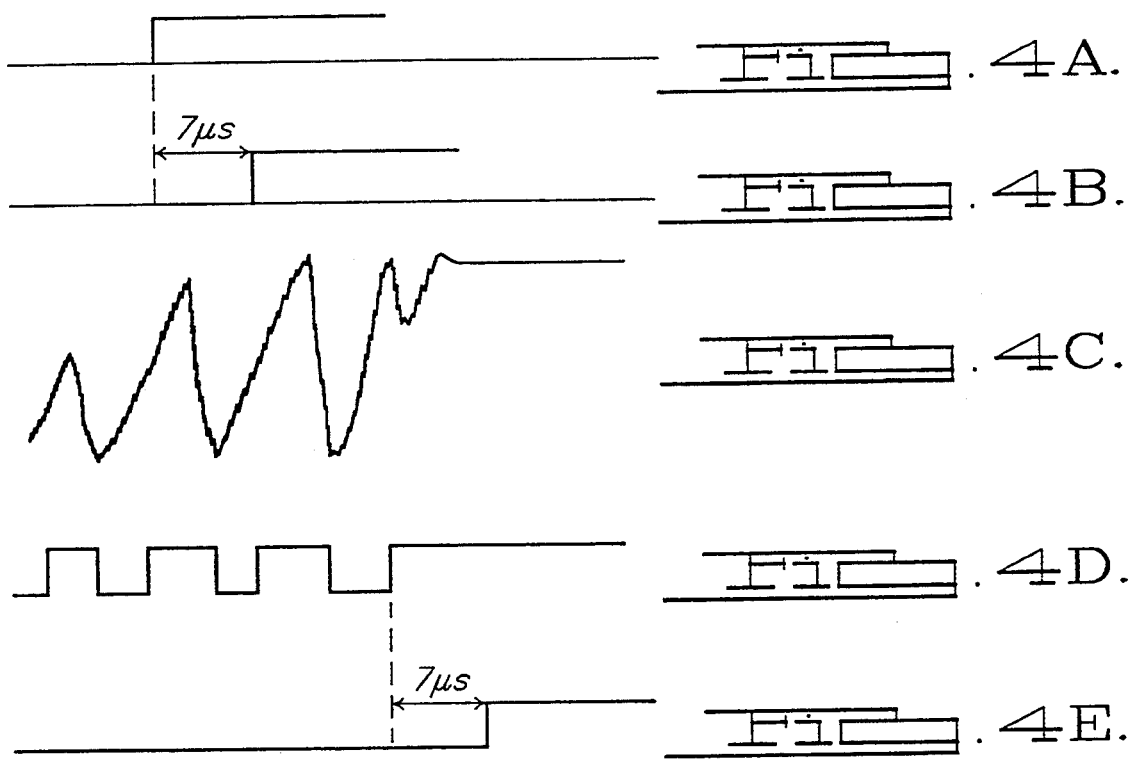
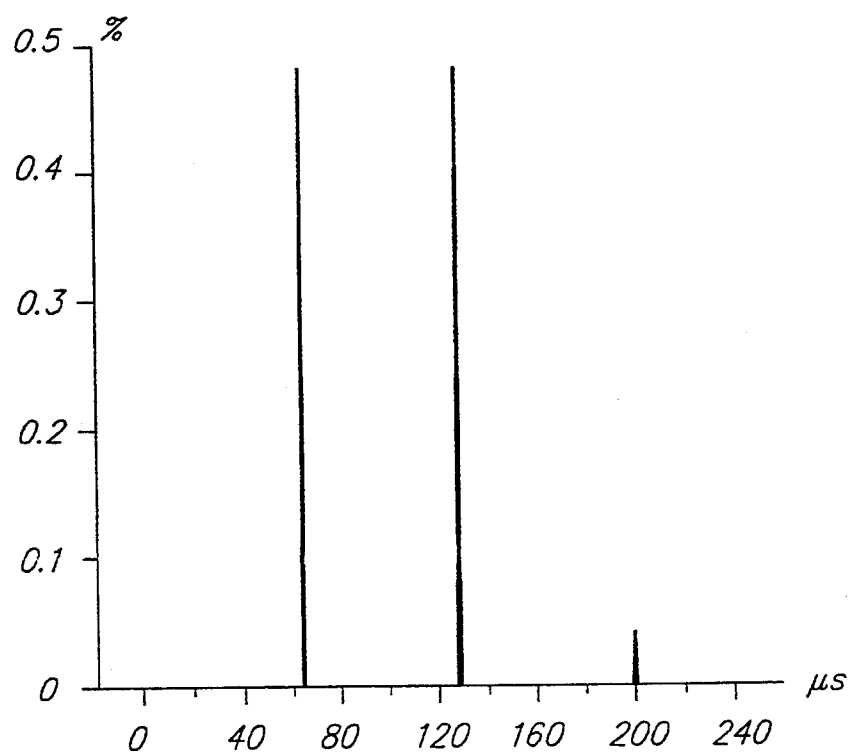
FIG. 5.

SYMBOL WIDTH MEASUREMENT SYSTEM

FIELD OF THE INVENTION

The present invention relates to measurement equipment and, in particular, to measurement equipment for measuring widths of pulse symbols transmitted over a single-wire bus under signal noise and ground offset conditions.

BACKGROUND ART

The Society of Automotive Engineers (SAE) encourages the entire automotive industry to develop a standard data link, preferably a medium-speed (Class B) multiplexed data communications system. The SAE established Recommended Practice J1850 (a set of technical requirements and parameters) has already been accepted by the industry as the communications link.

For J1850, pulse symbols travel over a single-wire bus as shaped pulses that resembles trapezoidal shaped pulses. Each node must have some means for receiving and converting the trapezoidal pulses into square-wave pulses of the kind that can be interpreted by a microcontroller.

The pulse signals travelling over a single wire bus in an automobile environment sometimes encounter uncontrollable ground offset voltages and electromagnetic interferences (EMI) or signal noise. Both ground offset voltages and the signal noise affect trip point locations along rising and falling edges of the trapezoidal shaped pulses. Distortions of the trip points do interject some measure of error in pulse widths during pulse conversion. The information contained in the original trapezoidal shaped pulse changes with respect to pulse width at the trip points of the pulse.

To illustrate the effects of trip-point distortion, consider a variable pulse width modulated (VPWM) bit stream containing trapezoidal shaped pulses. Assume a first data bit represent a J1850 "Short" symbol containing data between the trip points where the pulse width must range between 34 to 96 µs. Assume a second data bit representing a J1850 "long" symbol containing data between the trip points where the pulse width must range between 96–163 µs. It is entirely possible that ground offset voltages and signal noise could cause the original "short" symbol data in the trapezoidal pulse to stretch beyond 96 µs to about 102 µs such that the converted square-wave pulse yields data representing a "long" symbol.

Realizing this problem occurs at real time in an automobile environment and not in a laboratory where environmental interference can be controlled and pulse data can be accumulated using oscilloscope scopes and/or sophisticated mass storage techniques, a search was initiated to find some means of measuring pulse widths of symbol pulses in a manner which would yield symbol data somewhat free of pulse width distortion. That search ended in the measuring system of the present invention.

SUMMARY OF THE INVENTION

The present invention discloses a system and method for measuring pulse widths of symbols used for communicating messages in a medium speed multiplexed data communications system to determine distorted symbols. Reference patterns in histogram form are established that show the number of symbols have pulse widths that fall within and or outside accepted limits of widths for the measured symbol. The collected data of symbols issued from each node permits determining which node in the system is experiencing distortion of the symbol widths by ground offset voltages and/or signal noise.

BRIEF DESCRIPTION OF THE DRAWING FIGURES

FIG. 1 illustrates in block diagram form a multi-node, single wire bus communications network with a symbol width a measurement system of this invention connected to the bus for measuring symbol widths;

FIG. 2A depicts blocks of messages placed on the bus from various nodes at various times;

FIG. 2B depicts the structure of a typical message placed on the bus;

FIG. 2C shows an expanded view of a typical data byte of the message deputed in FIG. 2B;

FIG. 2D depicts the conversion of the data byte into square-wave pulses of varying widths appearing at the output of the IDR;

FIG. 3A depict the trapezoidal shaped waveform appearing on the bus; FIG. 3B depicts the square-wave pulse at the output of the IDR caused by a ground offset voltage that affects the trip point and FIG. 3C depicts a square-wave pulse unaffected by ground offset voltages;

FIGS. 4A and 4B depict the normal transfer delay of an edge of a symbol through SED; FIG. 4C depicts a typical signal noise signal that may affect a symbol width; and FIGS. 4D and 4E depict the extra delay that a noise symbol might interject which would distort the transfer of symbol data through SED;

FIGS. 5 and 6 depicts the ideal and typical histograms, respectively, for short, long and SOF symbols on the bus;

DETAILED DESCRIPTION OF A PREFERRED EMBODIMENT

Communications Network

Figure 6:
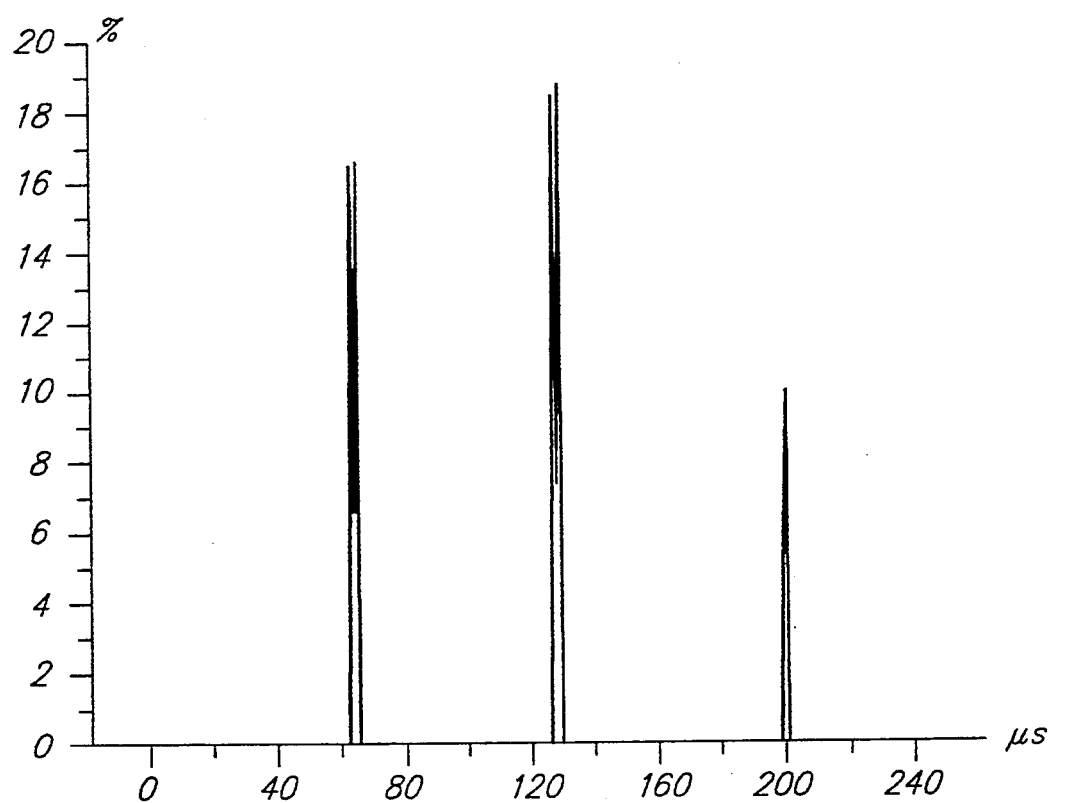

FIG. 1 depicts a block diagram of a communications network 9 and a symbol Pulse Width Measurement System 10 of the present invention. Network 9 includes several nodes 16a–16f employing integrated driver/receiver (IDR) circuits 20a–20f, symbol encoder/decoder (SED) circuits 22a–22f and microcontrollers (18a–18f) as taught in U.S. Pat. No. 5,274,636 dated Dec. 28, 1993 entitled "Automatic Multiplex Data Link System, Symbol Encoder Decoder Therefor" of Richard Halter et al. Ser. No. 871,259 filed Apr. 20 1992; U.S. Pat. No. 5,337,042 dated Aug. 9, 1994 of R. Hormel et al entitled "Vehicle Communications Network Transceiver, Transmitter Circuit Therefor" Ser. No. 951,988 filed Sep. 28, 1992 and "Vehicle Communications Network Transceiver, Ground Translation Circuit Therefor" Ser. No. 951,989 filed Sep. 28, 1992 respectively, now abandoned.

The node 16a-16f of network 10 couple between a non-twisted, single wire bus 12 and a plurality of sensors or application devices 14a-14f. The nodes 16a-16f connect to bus 12 via stub 13a-13f respectively. Bus 12 routes to each node disposed throughout, the vehicle supporting bi-directional transfer of a single data bit stream.

The MCUs, 18a-18f instruct SEDs 20a-22f to form messages using various established J1850 symbols in variable pulse width modulation (VPWM) bit streams. The IDRs massages the bit streams using waveshaping noise reduction techniques and unique line driving and grounding schemes before routing the messages over bus 12 to other nodes listening to messages placed on bus 12 (as taught in U.S. Pat. No. 5,337,042 of R. Hormel et al. entitled "Vehicle Communications Network Transceiver, Transmitter Circuit Therefor").

After receiving impetus from a sensor or the like, the MCUs of sending nodes generate bus messages containing extracted sensor data. Every node read signals on bus 12 at the same time (including the sending node). Two or more nodes may compete for control of the message and bus by initiating messages nearly simultaneously. From a settlement of this competition, called arbitration, only one winner emerges.

Arbitration, occurring on a symbol-by-symbol basis, originates at the falling edge of a start of frame (SOF) symbol provided that at least one other node sends a SOF simultaneously. A high level symbol dominates a low level symbol on the bus; a short low level symbol dominates a long low level symbol; and a long high level symbol dominates a short high.

Symbol Pulse Width Measurement System

Symbol Pulse Width Measurement system 10 includes an IDR 10, SED 22, MCU 18 (just as each node in network 9) and a personal computer 14. SED 22, however, contains an additional register 22H which stores temporarily a digital representation of a symbol in byte form each time a rising edge of a symbol pulse initiates a clock signal used to clock in the symbol byte into a 10 bit counter of SED (not shown).

A bus routes the byte data from register 22H to an input port of MCU 18 where the byte data contains data designating the pulse width of the symbol.

This deciphered data is placed in a data file on PC 14 in a histogram type format. Data from as many as a hundred thousand (100,000) readings of bits in a bit stream might be accumulated in the data file of PC 14.

The integrity of the data depends on the integrity of the conversion of the trapezoidal pulses into square-wave pulses performed by IDR 20 in system 10. If the true trip-points of the trapezoidal shaped pulses on bus 12 are distorted by ground offset voltages or by signal noise on the single-wire bus, then some means must be used to determine the source of the noise and to exercise steps to correct the problem.

Messages on the Bus

Messages on bus 12 from any given module may occur at any time. FIG. 2A depicts a possible global view of messages on the bus.

FIG. 2B illustrates a typical J1850 message. The origin of a message is determined by examining its header for the address of the node. Every J1850 message starts with a start of Frame (SOF) symbol and ends with an end of frame (EOF) symbol. Both the SOF and EOF symbols are bits of a chosen magnitude and duration. After an inter-frame separation (IFS) delimiter symbol, any node can freely transmit a new message on bus 12.

FIG. 2C depicts the data byte portion of the message of FIG. 2B in trapezoidal shaped pulses form as it appears on bus 12. When these trapezoidal pulses reach the IDRs and get converted into square-wave pulses, the integrity of the square-wave pulses depend upon the location of the trip-points used by the IDRs to form the square waves.

FIG. 2D depicts the result of IDR 20 converting the trapezoidal shaped pulses of FIG. 2A into square-wave pulses. Note that the data byte begins and ends with a HIGH to LOW logic level transition. The trip points of FIG. 2C initiate the transitions. If the trip points are not symmetrical than the transitions will be either delayed or expedited earlier than normal. Nominal locations of the trip-points will yield square-wave pulses as shown in FIG. 2D.

Symbol Pulse Width Measurement System

Normally, SED 22 of FIG. 1 receives the square-wave pulse data from IDR 20 and decodes the data into ten-bit words representing symbol lengths in a free-running 10-bit counter (not shown) in SED 22. Also, a four-bit address that routes to MCU 18 is generated for each bit that gets counted by the 10-bit counter. The four-bit address routes to MCU 18 while the lower 8-bits of the words route to a separate register 22H which pipes the 8-bit words directly into PC 14. PC 14 determines the pulse width represented by each 8 bit word and then increments a counter designated to indicate the widths of the pulses in a data file in a histogram format. The data file, depicted in TABLE 1, consists of 256 lines, each with two numbers, the symbol width and the number of symbols received of that width.

TABLE 1

| Symbol Width (μs) | No. Symbols Received |
| --- | --- |
| 0 | 0 |
| 1 | 0 |
| 2 | 0 |
| . | . |
| . | . |
| 60 | 0 |
| 61 | 137 |
| 62 | 12870 |
| 63 | 21659 |
| 64 | 48956 |
| 65 | 20943 |
| 66 | 13989 |
| 67 | 98 |
| 68 | 0 |
| . | . |
| . | . |
| 124 | 0 |
| 125 | 137 |
| 126 | 11870 |
| 127 | 23659 |
| 128 | 46950 |
| 129 | 22005 |
| 130 | 11987 |
| 131 | 98 |
| . | . |
| . | . |

TABLE 1-continued

| Symbol Width (µs) | No. Symbols Received |
| --- | --- |
| 196 | 0 |
| 197 | 6 |
| 198 | 400 |
| 199 | 1077 |
| 200 | 2196 |
| 201 | 0 |
| 202 | 0 |
| 203 | 0 |
| 204 | 0 |
| . | . |
| . | . |
| . | . |
| 255 | 0 |

Ground Offset Voltages Effects

FIG. 3A depicts two short symbols appearing on bus 12 as trapezoidal pulse shaped bits. A 6 VDC trip point caused by ground offset voltage of around 2 VDC forces the generation of the square-wave pulse (FIG. 3B) at the output of the IDR. Notice that the square-wave is not symmetrical. The pulse width of the first pulse is 56 µs while the second pulse is 72 µs.

FIG. 3C depicts a symmetrical square-wave pulse resulting from a normal 4 VDC trip-point not affected by ground offset voltages tripping the pulse generating circuits in the IDR. The pulse width of the first and second pulses is 64 µs. Note that the trip points for the square-wave pulses of FIGS. 3B and 3C occur and ½ the amplitude of the trapezoidal pulse shaped bits.

Signal Noise Effects

FIG. 4A depicts a normal pulse leaving the output of IDR 20 of FIG. 1. FIG. 4B depicts the output of the digital filter of SED 22. Note that a delay of about 7 µs occur during the transfer.

FIG. 4C illustrates signal noise that gets coupled over the pulses appearing on bus 12. FIG. 4D shows the effects of that signal noise has on the pulse of FIG. 4A at the output of IDR 20. FIG. 4E shows the effects the signal noise has on the output signal from the digital filter of SED 22. Note that the signal noise could cause a delay in reading the rising edge if the digital filter of SED 22 happens to sample the signal while the bus is below the trip point. Hence, the output of the digital filter in SED 22 would be delayed by the noise signal plus the normal 7 µs delay inherent in the system.

Analysis of the Histograms stored in the Data Files of the Personal Computer.

The displays of the histograms stored in the data files of PC 14 appear as shown in FIGS. 5–10. Ideally, the symbols appear in histograms as in FIG. 5. Normal conditions are depicted in FIG. 6 when no DC offset voltage and no signal noise interfere with the bit streams appearing on bus 12. Note that the symbols are within one microsecond of the nominal values. This error is due to the sampling of the digital filter discussed supra.

Figure 7:
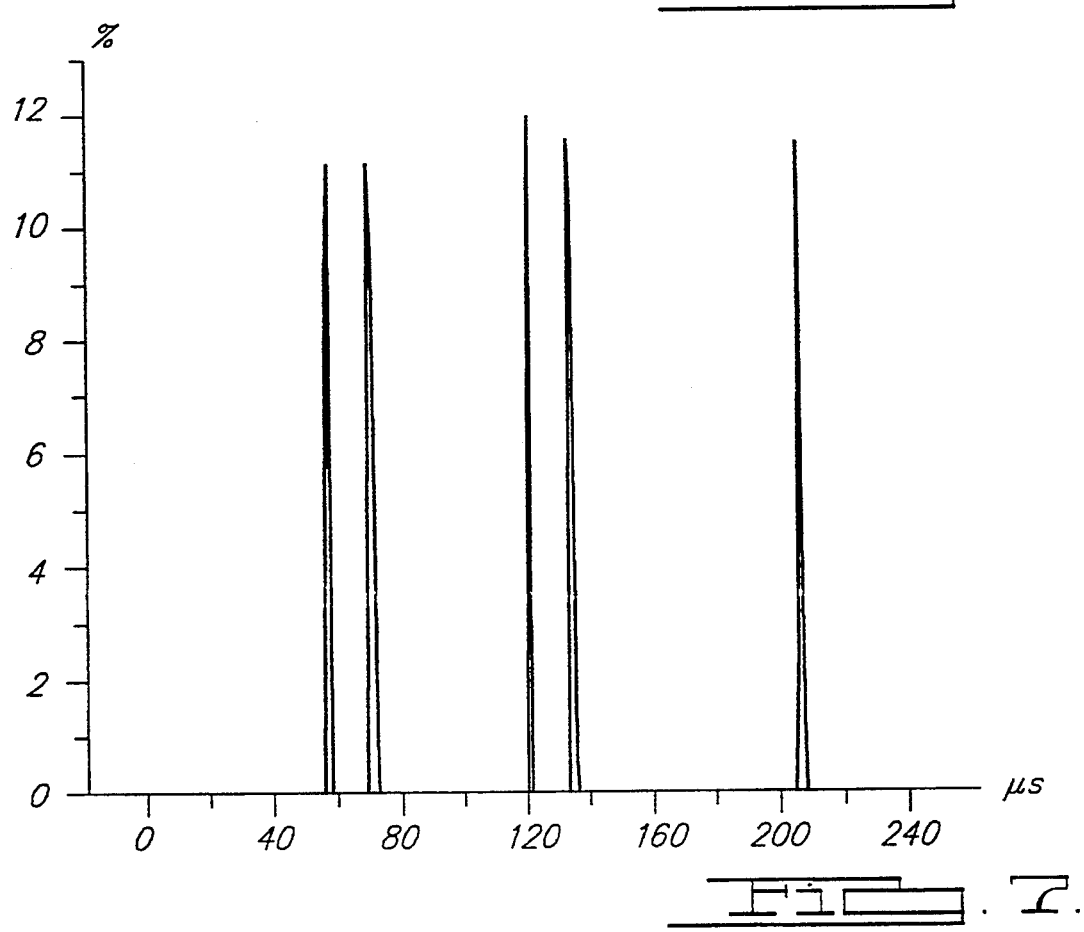
FIG. 7 depicts the histogram that displays the pattern that indicates the symbol widths are being affected by ground offset voltages.

FIG. 7 depicts the effects of DC offset voltage. Note that the short (64 µs nominal) and long (128 µs nominal) symbols will fall into an upper and a lower group of pulse widths. Also, note that all of the SOF (200 µs nominal) symbols will have pulse widths above 200 µs, somewhere around 210 µs since the SOF is a HIGH symbol.

Figure 8:
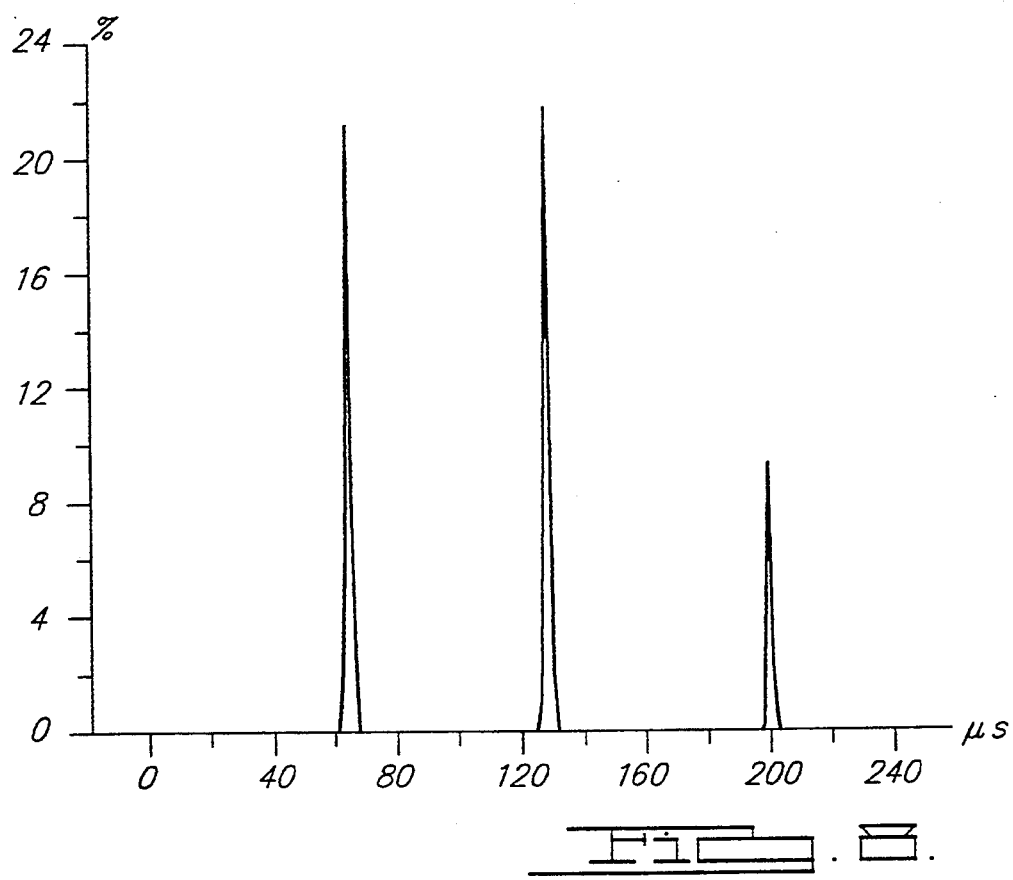
FIG. 8 depicts the histogram that displays the pattern that indicates the symbol widths are being affected by signal noise.

FIG. 8 depicts the effects of a signal noise injected into bus 12. Note a wider spectrum of pulse widths are formed with respect to the spectrum of pulse widths shown in FIG. 6.

Figure 9:
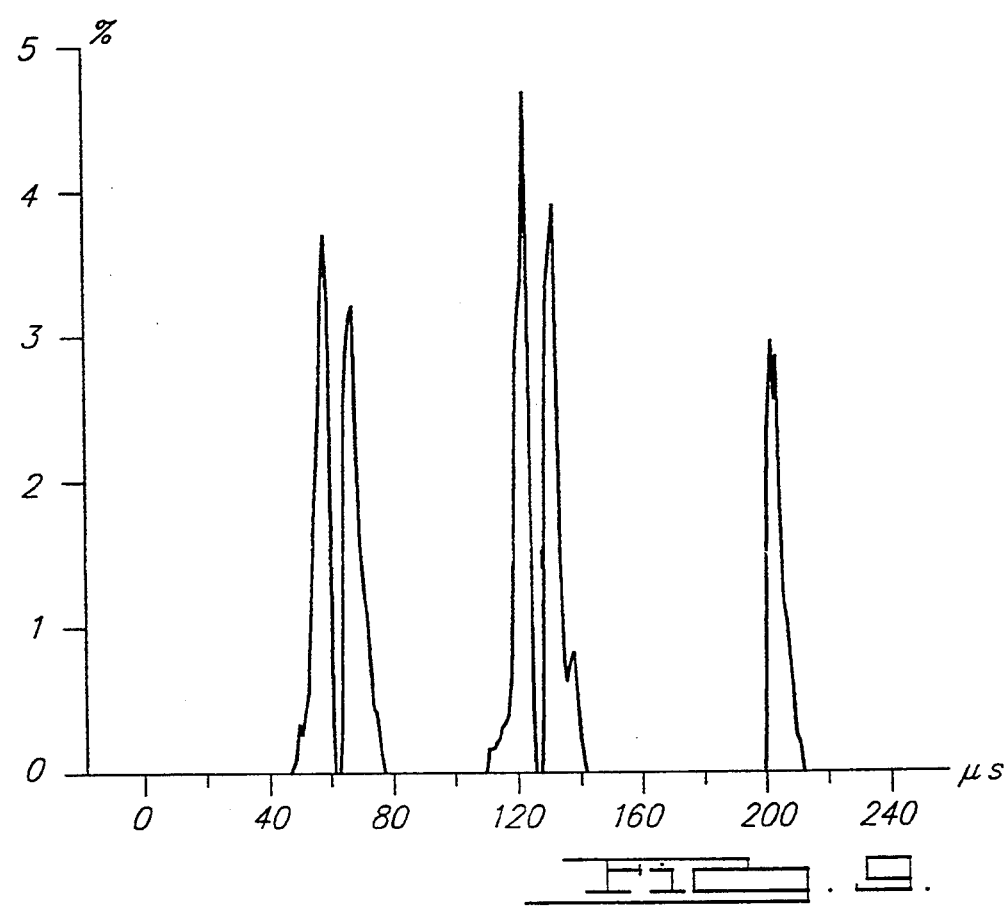
FIG. 9 depicts the histogram that displays the pattern which indicates the symbol widths are being affected by both ground offset voltages and signal noise.

FIG. 9 depicts the effects of signals noise and ground offset voltages on the bus. Note that the short and long symbols will fall in to upper and lower groups of pulse widths and the spectrum of pulse widths generally extend over a wider range for each of the three categories of symbols.

Figure 10:
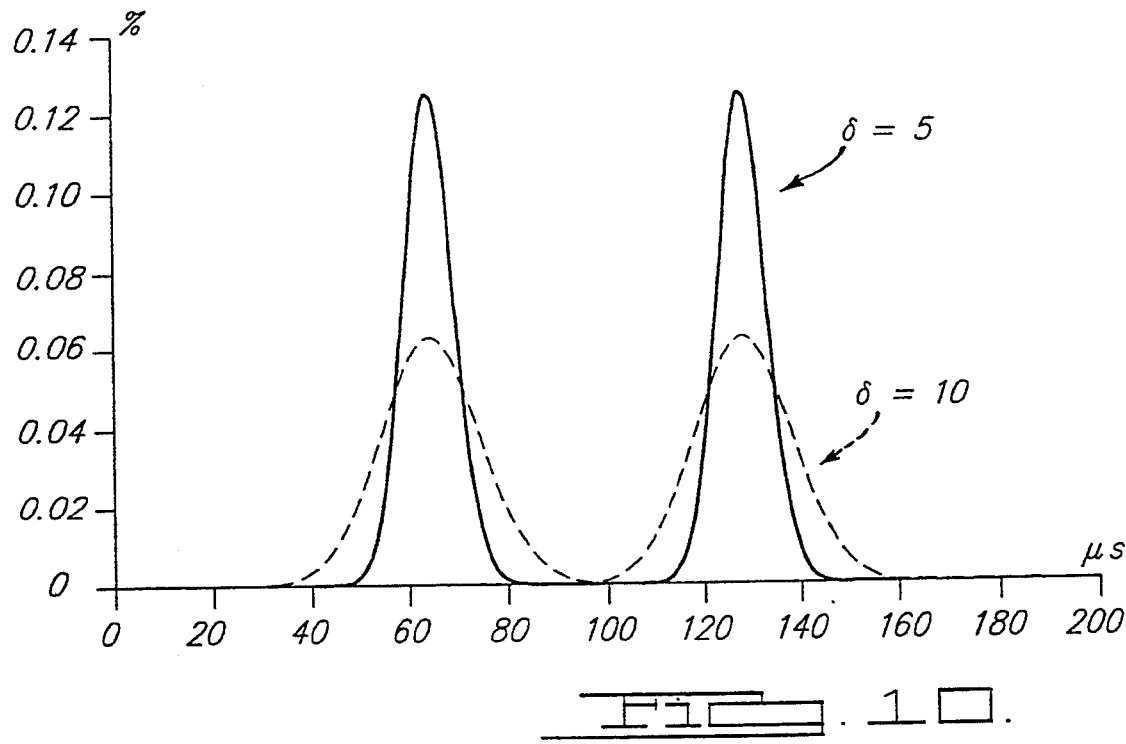
FIG. 10 depicts a theoretical standard distribution of pulse widths affected by both low level noise and high level noise and FIG. 11 illustrates in flow diagram form the instructions to the CPU for isolating the nodes which might be issuing symbols distorted by ground offset voltages and/or signal noise.

FIG. 10 provides theoretical standard distribution functions of the pulse widths. One set has a mean of 64 µs and the other set has a means of 128 µs. The standard distribution with sigma=5 is the lower noise condition while sigma=10 is the higher noise condition. The sigma=10 situation depicts the condition where "short" symbols begin to look like "long" symbols and vice versa. Hence, the operator should take steps to find the ground offset condition or injected noise which could cause the distortion of the symbol information.

Detecting Modules Affected by Signal Noise and/or DC Voltage Offsets

The histograms shown in FIGS. 5–8 can be used as patterns for detecting when voltage offsets and signal noise are affecting the bus. If the histogram for the symbols on bus 12 is printed out on printer 15 attached to PC 14, and a pattern occurs that looks like FIG. 7, the operator should suspect a voltage ground offset problem.

The origin of a message is determined by examining the message header for its address. If an evaluation of symbol widths shows that there is a wide spectrum of pulse widths, it is possible that there are one or more nodes which have grounding problems. In order to detect the problem node, the symbol widths of messages from different nodes should be examined separately. To do this, the header of each message is examined, then the pulse widths of the data bytes and the CRC are recorded. It is necessary to wait until after the header is complete to begin recording pulse widths since it is possible that other modules are also transmitting and attempting to arbitrate for control of bus 12. By examining these pulse widths and comparing them to those of the entire bus traffic, it will become apparent which module is marginal. The suspected node module should be replaced or repaired.

If a pattern exists, such as depicted in FIG. 7 or FIG. 10, then signal noise is suspected. All the nodes will probably be affected by the same noise signal. Hence, to remedy the signal noise problem, the source of the noise must be detected. Harnesses running near bus 12 or components emitting EMI should be moved or shielded if EMI from them affects the bus.

As an assumption, signal noise is less common on the bus since the total impedance to ground is low, between 300 and 1500 ohms. To inject signal noise on the bus, fairly large EMI signals are needed.

Operation of the System

The operator initiates the symbol width measurements by first determining the status of symbols on bus 12 of FIG. 1. The operator sets up PC 14 and printer 15 to obtain a Histogram comprised of about 20,000 passes of symbols on bus 12. The histogram is evaluated by comparing the histograms with those of FIGS. 5–9 to determine whether ground offset voltages or signal noise affects the bus.

If a problem does exists, then the symbol widths of messages from different nodes should be examined separately. To do this, the header of each message is examined, then the pulse widths of the data bytes are recorded. The histograms of the data bytes are compared to the data byte portions of the histograms of FIGS. 5–9. When the defective node is found, then the suspected node modules should be replaced or repaired.

Figure 11:
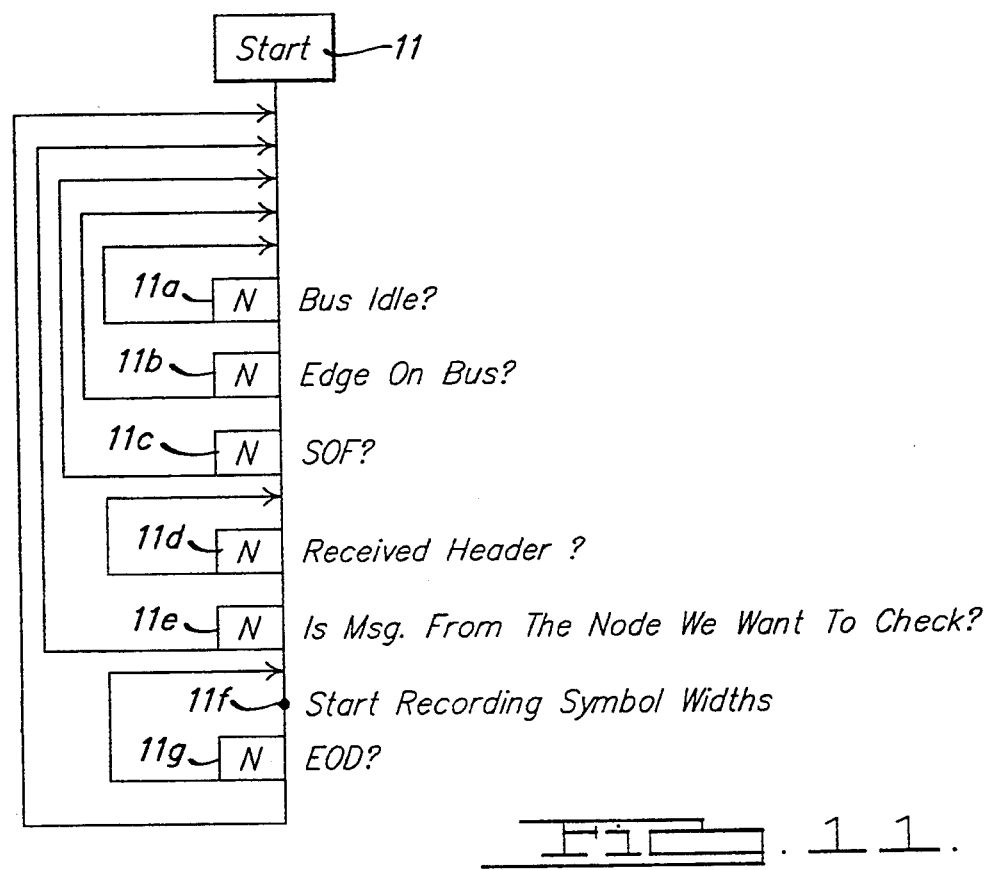

FIG. 11 provides a flow chart of the instruction to the CPU for isolating the nodes which might be issuing symbols distorted by ground offset voltages and/or signal noise. This flowchart differs from the conventional box and diamond flow chart. In this chart, when introducing a decision, the flow line branches to the right or left. A branch may be caused by either a YES or NO condition, with these being signified by a Y or an in a small box as indicated. An arrowhead depicts where secondary flow rejoins the main flow. Actions are signified by a small black circle on the lines, the description of the action being given to the left or right of the flow lines. A reference number indicates the position or step along the line being discussed.

The operation in FIG. 11 starts at step 11. The operator initiates operations of the firmware in MCU 18 of FIG. 1. CPU 18a receives instructions at step 11a of FIG. 11 to look for a bus idle condition. After finding the bus idle, CPU 18a receives the instruction at step 11b to look for a pulse edge on bus 12. Upon finding an edge, then CPU 18a receives the instruction at step 11c to look for a start of frame (SOF) symbol. At step 11d, CPU 18a receives the instruction to determine if a header has been received. If so, then at step 11e, CPU 18a receives the instruction to determine if this message is from the node we want to check. If not, CPU 18a receives the instruction to continue to look at messages from other nodes until the desired node is detected. After the detection of the desired node, CPU 18a receives the instruction at step 11f to start recording the symbol widths up to but not including the end of data (EOD) symbol at step 11g and continue to record data in histogram form in the data file on PC 14 and then print out graphs for performing comparison of the data with the data shown in FIGS. 5–9. From the comparisons, the operator can tell if the node has a ground offset voltage problem or a signal noise problem.

It is understood that the above-described embodiments are mainly illustrative of the principles of the invention. One skilled in the art may make changes and modifications to the embodiments without departing from the scope and the essential characteristics therefore.

What is claimed is:

1. A symbol width measurement system used with a multi-node multiplexing data link system, wherein each node connects between a sensor or an application device and a single wire bus, wherein the sensor or application device provides measurand data to an associated node, wherein each node contains modules for translating the measurand data into variable pulse width modulated (VPWM) line codings of symbols prescribed for use in an automotive industrial standard data link, wherein the VPWM data travels over the single wire bus in a format that resembles a bit stream of trapezoidal pulse shaped bits, said system comprising:

(a) an interface device for connecting the symbol width measurement system to the single wire bus, the interface module containing circuits for receiving the bit stream appearing on the bus and converting the trapezoidal pulse shaped bits into a stream of square-wave pulses of variable widths at an output terminal wherein the widths of each square-wave pulse corresponds to symmetrical trip-points along rising and falling edges of each trapezoidal pulse shaped bit in the bit stream, the trip-points being established at voltage levels corresponding to one-half the amplitude of the trapezoidal pulse bits;

(b) a decoder device for receiving groups of a chosen number of pulses of the stream of square-wave pulses at an input terminal of said decoder device, the number of bits being chosen to enable examination of all the nodes in the data link system and after filtering each group of pulses to remove single extraneous noise pulses of a chosen length, providing at a first output bus a coded address used to designate which prescribed symbol the filtered group of bits represent and producing at a second output bus a group of bits arranged in an output register as a parallel byte of data representing the pulse width of the designated symbol;

(c) a microcontroller (MCU) connected to the first output bus of the decoder device for receiving the coded address and connected to the second output bus of the decoder device for receiving each byte prescribing the pulse width of the designated symbol from the output register, the MCU having a CPU and a firmware program for instructing the CPU to collect the series of bytes of pulse width data of designated symbol and to provide that data at an output bus of the MCU;

(d) a personal computer network containing a personal computer connected to receive the series of bytes of pulse width data from the output bus of the MCU and for storing the series of bytes of pulse width data into a data file in a histogram type format and containing an output device for producing visible graphs of the histograms of the pulse width data received from the decoder device, wherewith an operator can collect histograms of the pulse widths of the symbols placed on the bus and determine whether a pattern of pulse widths reveals true symbol lengths, symbol distorted by ground offset voltages and/or symbols distorted by signal noise caused by electromagnetic interference affecting the bus and/or one or more nodes connected to the bus.

2. Apparatus in accordance with claim 1 wherein a first group of histograms are established which denotes acceptable pulse widths of symbols placed on the bus.

3. Apparatus in accordance with claim 2 wherein the acceptable pulse widths would be the widths of symbols designated as shorts, longs, and start of frame and/or end of frame, wherein the short symbols have a nominal pulse width of 64 $\mu$s, the long symbols have a nominal pulse width of 128 $\mu$s and the start of and end of frame both have a nominal pulse width of 200 $\mu$s.

4. Apparatus of claim 1 wherein after establishing histograms by extracting pulse width data from the trapezoidal pulse shaped bits appearing on the single-wire bus which denote acceptable pulse widths for symbols designated as short, long and start-of-frame, to provide circuits and firmware instructions to the MCU for collecting in histogram format short and long data for selected nodes to determine if the histograms of the selected nodes generate pulse widths which fall in the pattern of histograms which reveal true symbol lengths, symbols distorted by ground offset voltages and/or symbols distorted by signal noise caused by electromagnetic interference affecting the bus and/or one or more nodes connected to the bus.

5. A method for determining in an automotive environment the integrity of streams of communication symbols placed on a single-wire bus as trapezoidal pulse shaped bits from a multi-node multiplexing data link system comprising:

providing an interface circuit for extracting the trapezoidal pulse shaped bits from the bus and converting the extracted into square-wave pulses;

providing means for decoding a selected group of the pulses in order to determine which symbols are being placed on the bus;

providing means for accumulating pulse-width data of each symbol placed on the bus;

establishing a reference set of histograms revealing patterns of true symbol pulse widths for the selected symbols used in the system, pulse widths that indicate distorted symbol widths caused by ground offset voltages, pulse widths that indicate symbols distorted by signal noise caused by electromagnetic interference and pulse width that indicate symbols distorted by both ground offset voltages and signal noise; the establishing of the reference set of histograms being accomplished by:

a) obtaining pulse-width data of square-wave pulses extracted from the trapezoidal pulse shaped bits appearing on the single-wire bus that represent; 1) the true symbol pulse widths for the selected symbols used in the system, 2) distorted symbol widths caused by ground offset voltages, 3) distorted symbol widths caused by signal noise, and 4) distorted symbols caused by both ground offset voltages and signal noise;

b) storing a substantial amount of the pulse width data in a data file of a personal computer in a histogram format;

c) printing out reference patterns of the histograms and identifying the reference patterns in accordance to the types listed above in element a);

after establishing the reference patterns of histograms, collecting histograms of the symbols under test placed on the bus by storing a similar amount of pulse-width data appearing on the single-wire bus as was used to establish the reference patterns of histograms and by printing out the patterns of histograms for comparison to the reference pattern of histograms to determine if ground offset voltages and/or signal noise is affecting the pulse widths of the symbols placed on the bus;

if a histogram reveals that the symbols are being affected, then determining by addressing each node in the multi-node system to determine which node is transmitting symbols that are being distorted;

determining by comparing print-out patterns of the collected histograms to the reference patterns of histograms in order to classify the type of distortion affecting the symbol and to determine whether the entire multi-node multiplexing data link system or one or more nodes are being affected by signal noise;

removing the effects of signal noise affecting the bus or a particular node by removing or shielding harnesses or components emitting electromagnetic interference;

if a histogram reveals that the symbols from a particular node is being affected by ground offset voltages, repairing the affected node by:

a) replacing affected modules; or b) replacing the affected node.

6. The method of claim 5 further comprising the step of collecting pulse widths of all symbols containing short and long symbol widths and including such pulse widths along with the short and long symbol data.

* * * * *